March 8, 1966 P. ZUPPIGER 3,238,893

VARYING SPEED TRANSPORT APPARATUS, TRANSPORT MEMBERS AND COUPLINGS

Filed Nov. 27, 1963 6 Sheets-Sheet 1

INVENTOR.
Paul Zuppiger
BY
Ammentraut and Daniels
ATTORNEY

March 8, 1966 P. ZUPPIGER 3,238,893

VARYING SPEED TRANSPORT APPARATUS, TRANSPORT MEMBERS AND COUPLINGS

Filed Nov. 27, 1963 6 Sheets-Sheet 2

INVENTOR.
Paul Zuppiger
BY Aumentrout and Daniels
ATTORNEY

INVENTOR.
Paul Zuppiger
BY
ATTORNEY

INVENTOR
Paul Zuppiger

BY Sommers and Daniels

ATTORNEY

INVENTOR
Paul Zuppiger
BY Hammond and Daniels
ATTORNEY

INVENTOR
Paul Zuppiger

BY [signature]

ATTORNEY

United States Patent Office 3,238,893 Patented Mar. 8, 1966

3,238,893

VARYING SPEED TRANSPORT APPARATUS, TRANSPORT MEMBERS AND COUPLINGS

Paul Zuppiger, Carouge, Geneva, Switzerland, assignor to The Battelle Development Corporation Filed Nov. 27, 1963, Ser. No. 326,525
Claims priority, application Switzerland, Nov. 29, 1962, 14,042/62
20 Claims. (Cl. 104—25)

This invention relates to transport apparatus, and more particularly the invention is concerned with transport systems having a series of coupled movable members, and with the members themselves and their couplings.

An object of the present invention is the provision of members for forming a circuitous system with respect to each other and being moved rectilinearly about each other in the system for changing direction of alignment and to achieve in combination with the members, coupling components for maintaining the members coupled in the aligned conditions and adapted to change couplings while the members are being rectilinearly shifted.

A further object of the invention is the provision of members of the character indicated in which the members are adapted to be relatively shifted rectilinearly in the directions of two rectangular coordinate axes to change couplings and at least some of the couplings achieved are hinging couplings whereby the members so coupled have hinging freedom about an axis parallel to one of the two rectangular coordinate axes.

Another object is the provision of members for forming a circuitous system with respect to each other and being moved rectilinearly about each other in the system for changing direction of alignment, and to achieve in combination wih the members, coupling components which at least in some of the instances of coupling interconnect the so coupled members not only for being moved rectilinearly about each other in the directions of two rectangular coordinate axes of the members but pivotally on an axis extending in the direction of the third rectangular coordinate axis of the member.

Another object of this invention is the provision of members of the character indicated in which slides and slideways accomplish the coupling and the slideways cooperate with projections set off from corresponding ends of the slides for the projections to travel rectilinearly through positions between ends of the slideways.

Another object of this invention is the provision of transport apparatus wherein members of the character indicated have their coupling components responsive to rectilinear movement of the members with respect to each other in the transport system, for changing couplings of the members consistent with which alignment of the members is to be supplanted by the other.

Another object is that of providing members and transport apparatus of the character indicated in which the members are greater in length than in width for moving in alternating widthwise and lengthwise movements and in transitional shifting movements between each of the widthwise and lengthwise movements.

A further object of this invention is the provision of transport apparatus of the character indicated wherein the members are moved at greater speed lengthwise than widthwise and transitionally at speeds varying between the lengthwise and widthwise speeds of movement.

Other objects in part will be obvious and in part pointed out more fully hereinafter.

In accordance with the present invention a circuitous series of similar movable adjacent members each have guide follower means adapting the member to be guided circuitously in first axial and transverse second axial movements and in a transitional shifting movement between each of the first and second movements. The movable means also affords coupling means including coupling components on the members. The coupling components advantageously have first coupling portions adapted to engage each other for coupling the members into coupled relations corresponding to first alignments of the members for corresponding first movements of the members to ensue, following which the first coupling portions disengage each other for the members to be coupled in second alignments for corresponding second movements of the members to ensue. The coupling components also have second coupling portions adapted to engage each other for coupling the members into coupled relations corresponding to the second alignments of the members for the corresponding second movements of the members to ensue. The second coupling components serve to disengage each other after the corresponding second movements of the members for the members to be coupled for next first movements of the members corresponding to the first aligned condition of the members.

Movements of the members in series are promoted by a drive and guide means, including circuitous guide means having a plurality of first guide sections for engaging the guide followers and guiding the members for movement in accordance with the first movements and corresponding first alignments while the members are coupled. A plurality of second guide sections of the guide means engage the guide follower means of the members and guide the members in movement in accordance with the second movements and alignments while the members are coupled. There are also intermediate guide sections extending from a corresponding end of one of the first guide sections to a corresponding end of one of the second guide sections, and each intermediate guide section serves for engaging the guide follower means of the members and guiding the members in a constantly same oriented axially parallel transitional shifting relation to each other. In the shifting relation, first opposed edges of those of the members adjacent to the corresponding end of the first guide section are in over-extending relation to one another and second opposed edges of those members adjacent to the corresponding end of the second guide section are in over-extending relation to each other. During this time the coupling components shift from whichever of the first and second movements is undergoing transition to the other, into a coupling relation corresponding to whichever of the first and second movements is to ensue. In this, alignments of the members being shifted are changed from one alignment to the other. The coupling components thus importantly are responsive to the transitional movement to achieve uncoupling and recoupling while the alignment of the members is being changed.

The drive and guide means also includes drive means drivingly engaging the members for the aligned movements and shifting of the members along the circuitous guide means to be effected with their guide follower means engaging the guide means, and it is under this drive that the alignments of the members change while the members travel from first to second guide sections through the corresponding transitional or intermediate guide sections.

The members provided may in fact take any of a variety of forms and still be characterized by the coupling feature. Thus, the coupling components may for example be on transport units thus to couple the units in series alignments, illustratively integrally on rectangular frame members which are adapted to accommodate rectangular platforms of transport units of a generally horizontal circuitous transport system wherein the frames form platform members with the platforms, or the frame members may be adapted to accommodate sidewalls of a generally vertical lift and generally horizontal loading and unloading elevator system wherein the frames form sidewall members with the elevator transport unit sidewalls, or in way of further illustration the members referred to for the system may be rectangular sidewalls or platforms of corresponding conveyances, the platforms or sidewalls themselves being directly integral with the coupling components.

The attached drawings illustrate by way of example embodiments of transport means and members thereof in combination with coupling components according to the invention, and FIGURE 1 is a diagrammatic plan view of a circuitous guide means;

Figure 9:
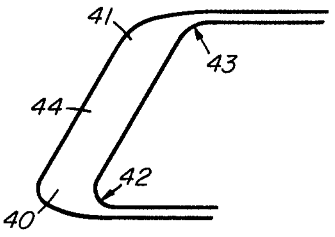
Figure 10:
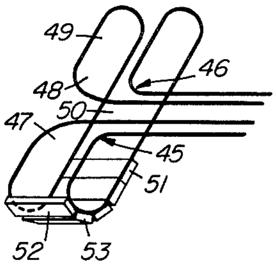
Figures 11, 12, 13:
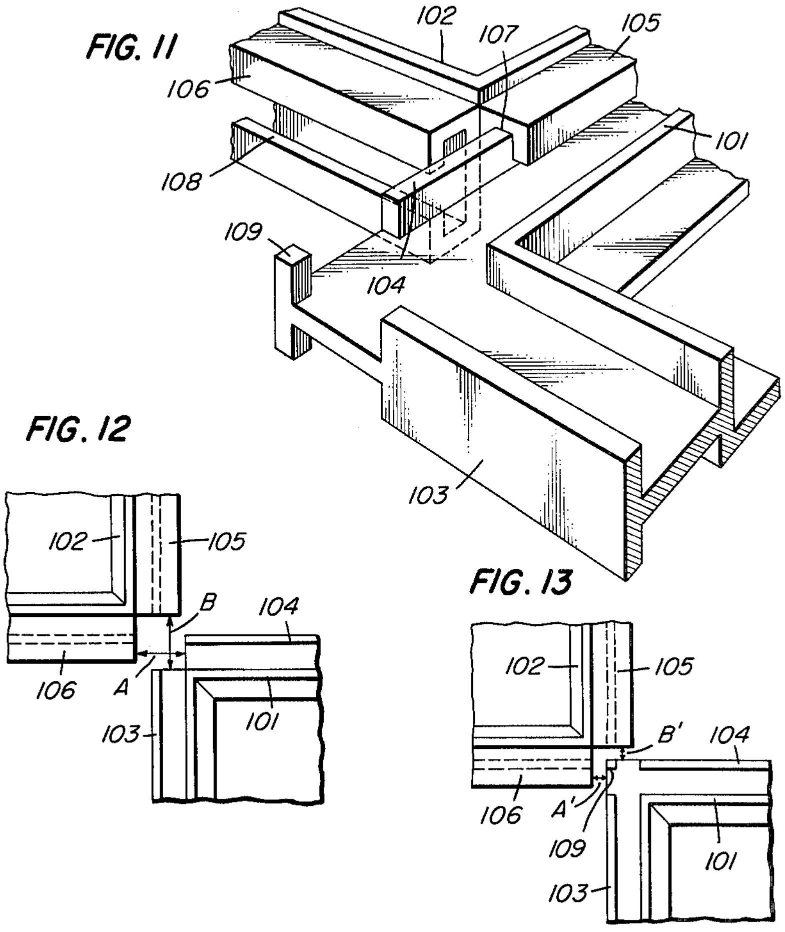
Figures 14, 15:
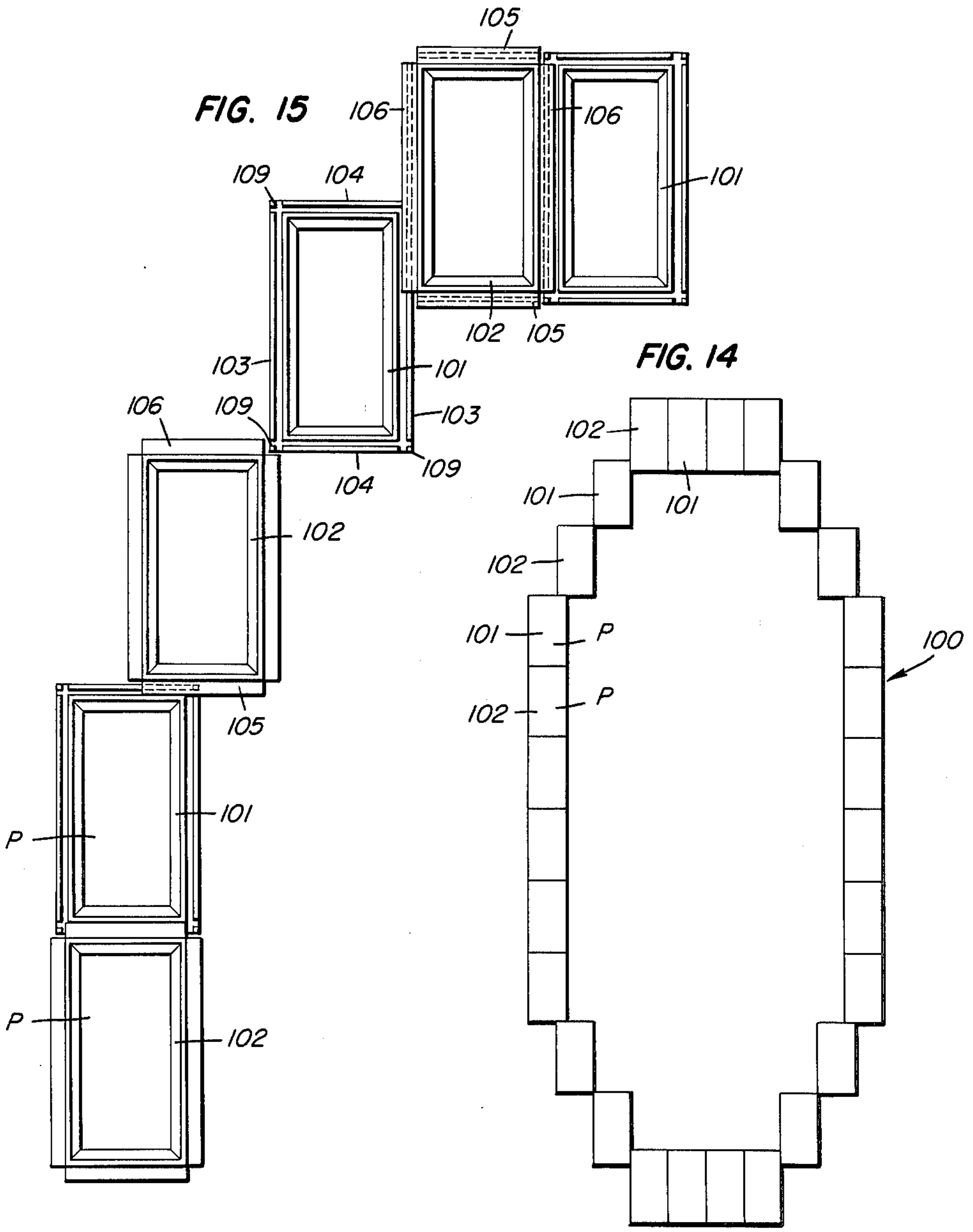
Figure 16:
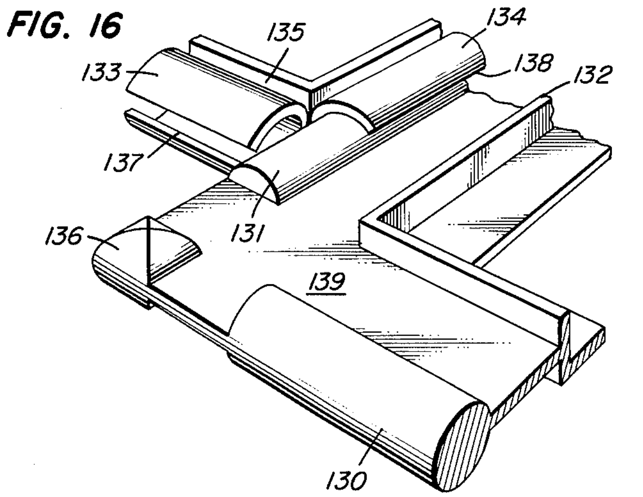
Figure 17:
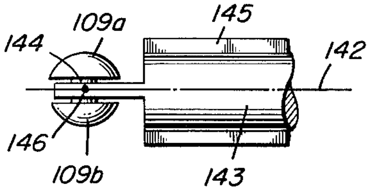
Figure 18:
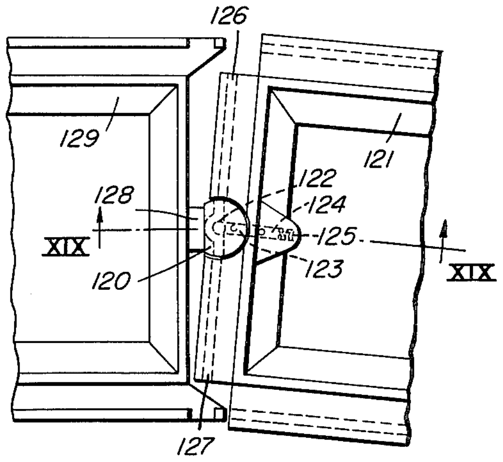
Figure 19:
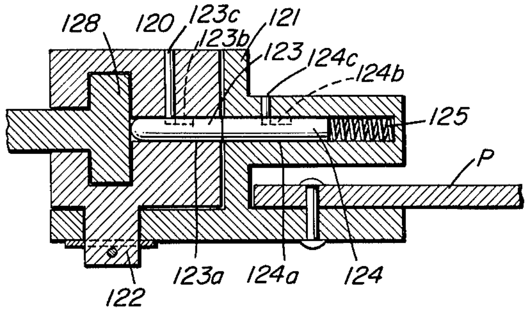

FIGURES 9 and 10 each illustrate alternative arrangements of portions of the guide means;

FIGURE 11 is a perspective view of a coupling arrangement;

FIGURES 12 and 13 are plan views corresponding to FIGURE 11 and differing in detail with regard to projections being omitted in the one instance and added in the other instance;

FIGURE 14 schematically represents members in circuitous series system;

FIGURE 15 is a local plan detail corresponding to FIGURE 14;

FIGURE 16 is a plan view of a modified coupling arrangement;

FIGURE 17 is a detail representing a further modified coupling arrangement;

FIGURE 18 is a plan view of a still further modification relating to couplings; and FIGURE 19 is a section taken along line XIX—XIX in FIGURE 18.

Figures 1, 8:
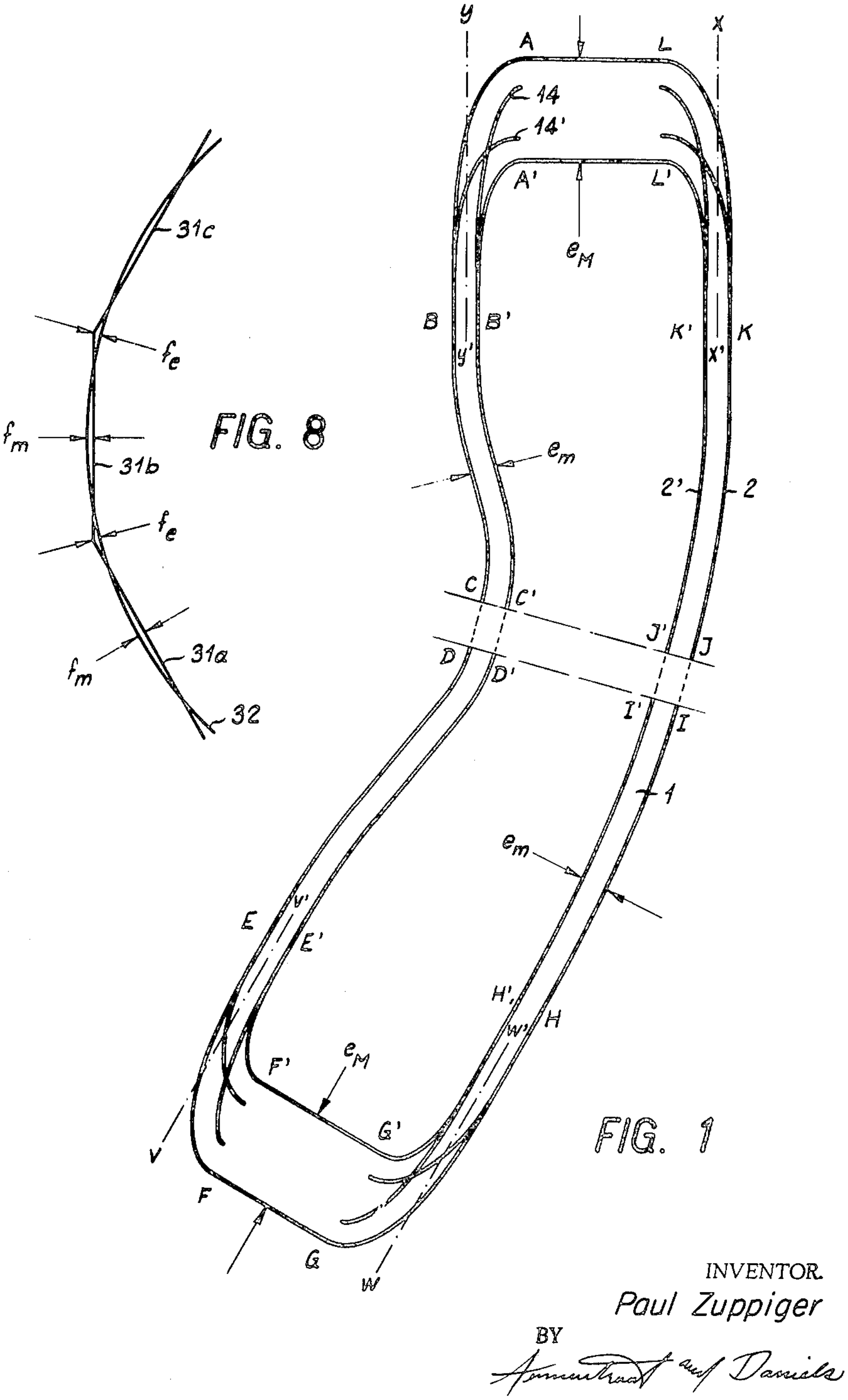
FIGURE 8 is a diagram showing the arrangement of a component of FIGURE 7.

The transport means in the embodiment of FIGURE 1 comprises circuitous guide means 1, as for example a track or line consisting of two rails 2 and 2', describing a closed loop circuit AA', BB', CC', DD', EE', FF', GG', HH', II', JJ', KK', LL'. The guide means includes at least two loading and unloading sections such as LL'–AA' and FF'–GG', at least two transport sections, such as BB'–CC'–DD'–EE' and HH'–II–'JJ'–KK'. The loading and unloading sections are located in loading and unloading zones connected by the transport means via transport zones in which are located the transport sections. These sections are connected to one another in the illustrated embodiment by four link or intermediate sections AA'–BB', EE'–FF', GG'–HH' and KK'–LL'. These various sections are distinguishable from one another by the following characteristics:

The rails 2, 2' in the transport zones are parallel and have a minimum spacing $e_m$; the axes of the track at the ends adjacent one loading and unloading section are parallel; thus axes *xx'* and *yy'* at ends KK' and BB' respectively are parallel; similarly, axes *vv'* and *ww'* at ends EE' and HH' respectively are parallel also; and the curves in the transport sections are arbitrary but their radii of curvature are large.

The rails 2, 2' in the loading and unloading zones are also parallel but have a maximum spacing $e_M$; they are perpendicular to the axes of the adjacent ends of the transport sections; thus section LL'–AA' is perpendicular to axes *xx'* and *yy'* of end portions KK' and BB' respectively; and similarly, section FF'–GG' is perpendicular to axes *vv'* and *ww'* of end portions EE' and HH' respectively.

The rails 2, 2' in the intermediate or link zones each describe a pre-determined curve and their spacing varies progressively from the minimum spacing $e_m$ to the maximum spacing $e_M$; the shape of these curves and the law which governs the variation in spacing will be considered below.

Figures 2, 6:
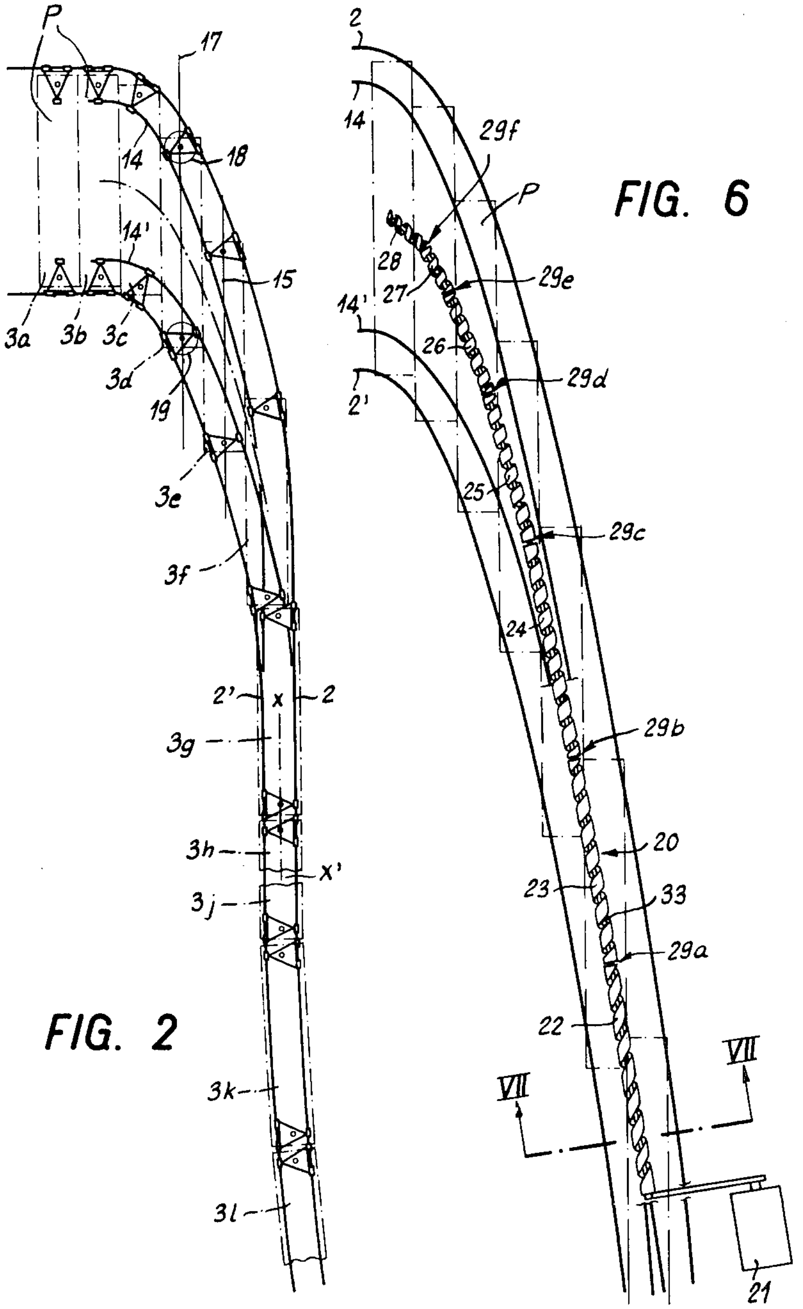
FIGURE 2 shows a portion of the guide means and a corresponding number of transport units or vehicles.
FIGURE 6 illustrates a representative portion of the drive means.
Figure 3:
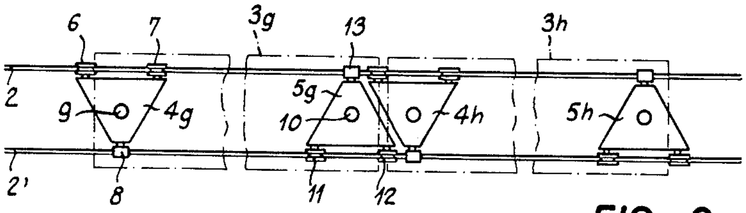
FIGURE 3 shows two of the vehicles end-to-end.
Figure 4:
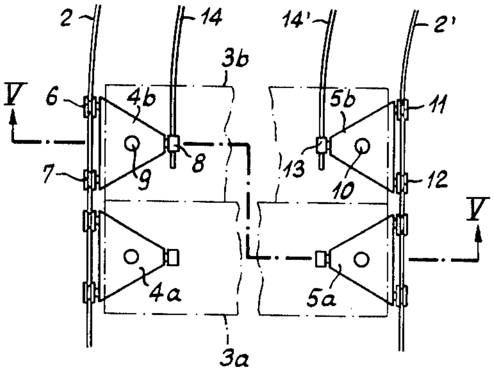
FIGURE 4 shows two of the vehicles side-by-side.

In the present embodiment, the transport means moreover comprises a plurality of rectangular members P of transport units or platform vehicles, such as the vehicles *3a*, *3b*, . . . *3l* shown in chain-dotted lines in FIGURE 2, and the rectangular members are adapted to form a circuitous train. Each vehicle also includes guide follower means which comprises two bogies, such as *4g* and *5g* in case of vehicle *3g*, or *4h* and *5h* in the case of vehicle *3h* (FIGURE 3). Each bogie, as for example bogie *4g*, has three supporting guide following wheels, as for example 6, 7 and 8, and is swivelly connected to the vehicle platform member P by a pivot, as for example 9, in the longitudinal axis of the vehicle. In all bogies, the spacing between the two wheels, as for example wheels 6 and 7, and the third wheel, illustratively wheel 8, is equal to the minimum spacing $e_m$ between circuitous guide means having rails 2, 2'. The two bogies of each vehicle, as for example bogies *4g* and *5g* of vehicle *3g*, are in inverted relationship, i.e. the two wheels 6 and 7 of the first bogie *4g* cooperate with rail 2' whereas the two wheels 11 and 12 of the second bogie *5g* cooperate with rail 2, the third wheels 8 and 13 conversely cooperating with rails 2 and 2' respectively. Consequently, over the transport sections of the track, the vehicles are arranged end to end and move lengthwise along the track, like vehicles *3g* and *3h* in FIGURES 2 and 3. The distance between the two pivots, as for example 9 and 10, of a vehicle is so selected that the spacing between the pairs of wheels 6, 7 and 11, 12 of bogies 4 and 5 will be equal to the maximum spacing $e_M$ of rails 2, 2' when these pairs of wheels come to occupy the endmost positions of the vehicle upon rotation of the bogies through 90° about their pivots (see FIGURE 4). Thus, over the loading and unloading sections of the track, the vehicles take up side by side positions and move transversely along the track, as shown in FIGURES 2 and 4 in the case of vehicles *3a* and *3b*.

The curve described by rails 2 and 2' in a link zone is governed by the longitudinal acceleration and deceleration law to which it is sought to subject the vehicles, as for example constant acceleration and deceleration, and by the condition that the axes 15 of the vehicles (FIGURE 2) must remain parallel with respect to axis *xx'*. The acceleration law determines the shape of the curve described by the center points of the vehicles. At selected points along this curve are drawn straight lines, such as 17, parallel to axis *xx'*. On each side of the curve a length equal to half the distance between the pivots of the vehicles, as for example 9 and 10 of vehicle *3g* in FIGURE 3, is marked off on each line. Using the marked-off points as centers, circles having a radius equal to half the spacing $e_m$, as for example the distance between the paired wheels and the third wheel of a bogie, are then drawn. The enveloping curves of these circles constitute the path of the rails 2 and 2' in the link zones. This is valid wherever the vehicles are required to slide longitudinally relatively to one another. Where the vehicles begin to slide transversely relatively to one another (position occupied by vehicle *3f*), the rails link up with the end of the transport section by describing an arbitrary merging curve, for example one of the standard forms of curves used in the railway art.

Figure 5:
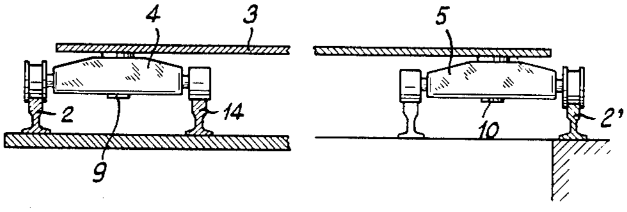
FIGURE 5 is a section taken on the line V—V of FIGURE 4.

In the link sections, the track further includes two auxiliary rails 14 and 14' (FIGURES 1, 2 and 5) which are spaced from rails 2 and 2' respectively by a distance equal to the minimum spacing $e_m$ between rails 2 and 2' along the transport sections of the track. These auxiliary rails cooperate with the third wheels, such as 8 and 13, of the bogies when the latter are made to pivot along the link sections of the track from the position shown in FIGURE 3 (transport section) to that shown in FIGURE 4 (loading and unloading section, and ensure stability of the vehicles when traveling over the link sections.

Figure 7:
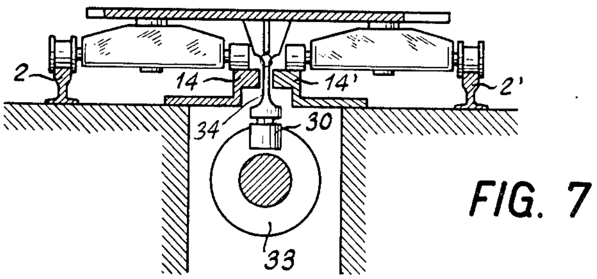
FIGURE 7 is a section taken on the line VII—VII of FIGURE 6.

The endless train formed by this series of vehicles is propelled by several drive units which are installed at least along the link sections of the track. These drive means may for example include a jointed and variable pitch screw 20 (see FIGURE 6) arranged below the level of the rails 2, 2', 14 and 14', and rotated by a motor 21, each vehicle being provided at its center with a device adapted to cooperate with the screw, for example a finger 30 (FIGURE 7). In the form represented in FIGURE 6, the screw is made up of a plurality of sections 22 to 28 which are connected to one another at points 29*a* to 29*f* by universal joint coupling (not shown). The screw sections are so arranged that their axes, as for example 31*a*, 31*b* and 31*e* (FIGURE 8, form mean chords of the curved path 32 followed by finger 30, as for example sagitta $f_m$ of the curved path 32 measured at the center of each screw section is practically equal to sagitta $f_e$ measured at the ends of the screw sections. Moreover, the diameter of these screw sections is greater than the length of these sagittas so that finger 30 will at all times cooperate with the screw whatever may be the position occupied by a vehicle over the link sections of the track. The jointed screw thus constitutes a polygon approximating the path followed by finger 30, the error of approximation being less than the diameter of the screw. The latter is provided with a helicoidal thread 33 (FIGURE 6) adapted to cooperate with finger 30. The pitch of the thread varies along each screw section so that the tangential speed imparted to finger 30 by rotation of the screw at a constant angular speed will coincide at all points with the instantaneous speed of the center of each vehicle. Of course, the pitch of the thread in the drive screw 20 varies only in the transition regions. Even there the component of motion in the direction of one axis of the members is maintained constant (the direction perpendicular to the axis along which adjacent members are coupled), and the acceleration or deceleration is provided only in the component of motion parallel to the axis along which adjacent members are slidably coupled. In the low speed zones, where the movement is all widthwise, the drive screw has a constant relatively low pitch. In the high speed zones, where the movement is entirely lengthwise, the drive screw has a constant pitch that is higher than the pitch in the low speed zones. Identical drive units are installed at least along the link sections of the track, and their motors, such as 21, are provided with suitable means to ensure synchronized operation. Where the rails 14 and 14' cross each other, a slot 34 is provided as shown in FIGURE 7 to enable fingers 30 to pass.

The described transport system operates as follows:

The drive units, which rotate in synchronism, set the vehicles in motion on the link sections of the track. This movement is transmitted via the coupling means to the remaining vehicles of the train which move end to end along the transport sections of the track and side by side along the loading and unloading track sections, the transition from the transport sections to the loading and unloading sections being made possible by the ability of adjacent vehicles of shifting one with respect to the other. Since the vehicles form an endless train, the number of vehicles passing per unit of time in the longitudinal direction at any point along the transport sections of the track is equal to the number of vehicles passing during that same unit of time but in the transverse direction at any point along the loading and unloading track sections. Consequently, the speed at which a vehicle moves varies between a minimum speed $V_c$ along the loading and unloading track sections and a maximum speed $V_t$ along the transport sections of the track, the ratio between these speeds being equal to the ratio between the width *a* and the length *b* of the vehicles, as for example $V_c/V_t=a/b$. The described transport means can thus operate continuously at a variable speed. Moreover, the orientation of the vehicles remains invariable, at least along each loading and unloading track section and the adjacent two link sections of the track.

The described guide follower means and guide means are ones of a number of possible forms, and the drive means likewise may take any other suitable form.

The described arrangement is concerned with the case where the two link sections of the track adjacent a loading and unloading track section, as for example link sections 40 and 41 (FIGURE 9), have their radii of curvature directed inwardly of the closed loop as shown by radii 42 and 43. This being so, loading and unloading section 44 joins up directly with the link sections. This arrangement constitutes a first illustrative type of loading and unloading section. But these link sections can also have their radii of curvature directed outwardly of the closed loop, as in the case of radii 45 and 46 (FIGURE 10) of sections 47 and 48. In this instance, the loading and unloading section 49 joins up indirectly with link sections 47 and 48 by describing a return loop 50 located beneath the latter, thus constituting a second illustrative kind of loading and unloading section. Along this return loop, the vehicles move upside down and it is therefore necessary, at least along this return loop, to adapt the guide means whereby the vehicles can travel in suspended fashion, as for example vehicle 51. Moreover, the vehicle coupling means must be so adapted as to enable the vehicles, when they are side by side, to hinge about their longitudinal sides, as in the case of vehicles 52 and 53.

It may be advantageous for the transport or relatively high speed sections to cross at one or more points at different levels. When the circuit includes two relatively low speed loading and unloading sections of the same kind, say of the character of FIGURE 1, the direction of movement of a vehicle, with reference to the latter, along one loading and unloading section is the reverse of that along the other loading and unloading section. In order for this direction of movement to remain unchanged in the loading and unloading sections, it suffices that the transport sections be made to cross at different levels. Alternatively, the circuit may include one loading and unloading section of the first kind (FIGURE 9) and another of the second kind (FIGURE 10) thereby maintaining unchanged the said direction of movement. As a general rule, when the loading and unloading sections are of the same kind, the direction of movement of a vehicle, with reference to the latter, in the two loading and unloading sections remains unchanged if the transport sections cross one another at different levels an odd number of times, and, when one of the two loading and unloading sections is of the first kind and the other is of the second kind, the direction of movement of a vehicle, with reference to the latter, in the two loading and unloading sections also remains unchanged if the transport sections cross at different levels zero or an even number of times. Conversely, when the two loading and unloading sections are of the same kind, the direction of movement is reversed if the transport sections cross at different levels zero or an even number of times, and, when one of the two loading and unloading sections is of the first kind and the other is of the second kind, the direction of movement is also reversed if the transport cross at different levels an odd number of times.

The application of such transport means to the transport of goods are several. But its inherent characteristic features, inter alia the absence of inpact and the substantially invarable orientation of one vehicle relatively to an adjacent vehicle, render the transport means particularly suitable for conveying people.

A coupling arrangement wherein coupling means movable with the members effectively connects a circuitous series of the members in accordance with the present invention, such as the generally rectangular frames 101 and 102 (see FIGURES 14 and 15) alternately in circuitous series 100, illustratively comprises slides and slideways, for example slides 103 and 104 on each of frames 101 and slideways 105 and 106 on each of frames 102. The slides 103 and slideways 106 on the respective frames 101 and 102 extend on first sides of the corresponding frames longitudinally parallel to first axes of the frames while slides 104 and slideways 105 extend longitudinally parallel to second axes of the corresponding frames 101 and 102 at substantially right angles to the aforementioned axes of the frames. The cross-sections of the slides and slideways (see FIGURE 11) are so selected that the slides can slide longitudinally inside the slideways while being laterally retained therein, which for example is permitted by grooves 107 and 108 being of T cross-section for receiving the corresponding slides which also are of T cross-section within tolerances giving close fit. The frames 101 in having the slides are termed male frames whereas the frames 102 in having slideways are termed female frames. The slides and slideways in being on each of the four sides of the male and female frames respectively are further characterized by having their lengths at most equal to that of the corresponding sides of the frames. The respective frames 101 and 102 are similar in their dimensions, preferably having their widths substantially equal to each other and their lengths substantially equal to each other and greater than the widths of the frames.

Thus coupled frames 101 and 102 can slide relatively to one another longitudinally but in extending in a T cross-sectional configuration cannot become detached from one another laterally. However, when positioned angle to angle, or better still during the time required for these frames to carry out a relative movement A+B (FIGURE 12) they are not connected to one another. To reduce this time, the coupling system sometimes comprises, as at each of four open corners of the generally rectangular slide configurations of the male frames, projections such as 109 (FIGURES 11 and 13), the shape of which projections are included within the solid extensions of intersection of the slides 103 and 104 which have their ends adjacent to the projection. The projections 109 are spaced from the corresponding ends of the slides and are fixed in the prolongation of the slides a distance from the ends of the slides which tolerate movement of the slideways 105 and 106 between the projection and the related slide ends for uncoupling the corresponding frames from either of the alignments thereof and recoupling the frames in the other of the alignments thereof and so that the time during which the frames are unhooked is shortened to a minimum, that is the time taken for the frames to complete the relative movement $A'+B'$.

Thus, when these generally rectangular frames 101 and 102 form members of the circuitous series 100, the male frames 101 alternate with female frames 102 and, as may be seen in FIGURE 15, the transition from one alignment to the other includes a corner to corner relation of adjacent male and female frames before uncoupling from one of the alignments and coupling into the other of the alignments has actually been completed. Each frame 101 and 102 illustratively is used as a chassis supporting one of the platforms P more particularly described with reference to FIGURE 2 and the platform P is provided with guide follower means engaging the circuitous guide means hereinbefore described. Vehicles formed by the platforms P and bogies 4 and 5 thus for example are driven around the circuit of the guide means 2, 2' by drive means in the manner described with reference to FIGURE 6. While the frames 101 and 102 are moving circuitously, it is the circuitous guide means which causes projections 109 to disengage and reengage the proper slideway 105 and 106 during transition of the frames from one of their alignments to the other and depending upon whichever of the alignments of the frames is to ensue in the circuitous series to supplant an alignment of the frames which is being terminated.

The slides and slideways in certain instances in accordance with the present invention may be integral with transport units $3a$, $3b$ . . . et cetera in lieu of being on frames attached to the platforms. In still another instance, the slides and slideways may be integral with elevator car side walls or the like or for example be on frames carrying side wall panels of elevator cars in a circuitous elevator car system, thus to uncouple and recouple the cars as they are changed in alignment in the system, as in the copending application of Gabriel Bauladon and Paul Zuppinger, Serial No. 353,515, filed March 20, 1964.

A modified constructional form of the proposed coupling system is indicated in FIGURES 18 and 19, in which at least some of the sets of coupling portions utilized for coupilng a circuitous series of members include a longitudinally relatively movable slide and slideway respectively as coupling portions each on the corresponding said member. For example, one of the coupling portions of a latter said set comprises a middle section such as 120 which is mounted on the female frame 121 by a pivot 122 which has its axis at right angles to the plane of the member or frame 121. The slide 128 of the male member, or of frame 129, has a length less than that of the pivotal section 120 and is arranged in the middle of the side of this frame. Conveniently, reliance is placed upon the circuitous guide means 2, 2', leading into a transition or linking section of the guide means, to achieve alignment of the pivotal section 120 with the related fixed coupling sections 126 and 127 so that slide 128 may shift longitudinally, for the adjacent frames in the coupling to be uncoupled. This alignment of the pivotal and fixed slideway sections in certain instances may prevail simply by friction until the members of the coupling are again coupled somewhere in the circuitous system. However, the provision of a positive holding means to maintain this alignment is preferred, and each such coupling for example thus may include a latch which is responsive to the coupling component 128 so as to maintain latched alignment of the pivotal and fixed slideway sections only in the absence of the pivotal slideway section being coupled with slide 128. As shown, the latch includes a radial bore 123$a$ in the pivotal coupling section 120 and this bore accommodates a slidable bolt extension 123 which is constrained in its sliding movement by having a short longitudinal groove 123$b$ therein intermediate the length thereof and a constraining pin 123$c$ engaged in this groove. Under the constraint of pin 123$c$ and the related groove, the latch extension nevertheless is free to move into the slideway a short distance in the absence of being engaged by the coupling component 128. The latch further includes a bore 124$a$ which is so aligned with the bore 123$a$ that an alignment of these bores occurs, accompanying an alignment of the slideway pivotal section 120 with the fixed slideway sections 126 and 127 so that longitudinal movement of the coupling component 128 is tolerated throughout the slideway. A latch bolt 124 has constrained slidable movement so that in one position the bolt may project over into the bore 123$a$ thus latching pivotal section 120 to the frame 121. This movement however is constrained by bolt 124 having a short longitudinal groove 124$b$ therein engaged by pin 124$c$ so that at most bolt 124 and the latching extension 123 of the bolt can move into a position corresponding to projection of the latching extension a short distance into the slideway of pivotal slide section 120. The latter position is normally taken under the bias of a spring 125 disposed between the inner end of bolt 124 and the adjacent frame 121. When the latching extension 123, and accordingly the bolt 124, is moved backward on insertion of the coupling component 128 longitudinally into the slideway of pivotal mounted coupling section 120, bolt 124 is retracted against the bias of spring 125 until the outer end of the bolt is aligned in the joint between the pivotally mounted section and frame 121, at which time the pivotally mounted section is free to pivot assuming that the coupling portion 128 engages only the pivotal mounted section. This freedom of pivoting prevails until the coupled frame members 121 and 129 are moved into a linking guide section of the circuitous guide means where uncoupling is to be effected. The guide means is so linearly directed that the several frames are at the same time linearly directed to bring the pivotal mounted coupling section 120 into alignment with the fixed coupling sections 126 and 127. The coupling portion 128 under these conditions is so shifted by the circuitous guide means that the latter coupling portion moves longitudinally out of the pivotal coupling section into one of the fixed coupling sections, thereby releasing the latch for it to couple the pivotally mounted section to the related frame 121.

In other words, when the two frames 121 and 129 are in end of end alignment, this modified constructional form of the coupling system enables the related members or frames, in addition to relative sliding movement, to move angularly in their planes. Where all female frames were so constructed, as for example with a mobile section such as 120 on two opposite sides, the entire string of frames is accordingly made flexible thereby considerably increasing the diversity of paths which this string of members or frames could follow when the frames are end to end connected by the pivotal slideway section. It will of course be appreciated that slide section may just as readily be made mobile instead of a slideway section for the pivoting.

A further modification involves having at least some of the slides and slideways of the coupling means for a circuitous series of members take form of a semi-cylindrical slide, and form of a slideway of companion semi-cylindrical configuration in which the semi-cylindrical slide may undergo relative longitudinal movement and substantially coaxial hinging movement while laterally retained by the slideway for coupling the related members or frames. In FIGURE 16 it will be seen that the tubular slideways 133 and 134 of a female frame 135 and the cylindrical slides 130 and 131 of a male frame 132 together with the projection 136 have a shape corresponding to that of the intersection of the adjacent semi-cylindrical slides 130 and 131 when prolonged. The slideways 133 and 134 are provided with axial slots 137 and 138, respectively, the width of which slot is greater than that of the web 139 connecting the slides 130 and 131 to the frame 132. This particular shape of the slides and slideways enables successive frames of a string, in addition to relative sliding movement, to move angularly relatively to one another about their sides, the slides and slideways forming hinges. Such hinges may be introduced on the members or frames to accommodate hinging in either or both of the alignments of the frames noted in the circuitous series thereof, such as where the series is to travel an incline or effect movements such as are represented in FIGURE 10.

To facilitate the engagement of the projections 109, the latter may be in the form of roller means, illustratively a pair of rollers 109a and 109b, having shaped rolling surfaces. The rollers are symmetrically mounted in relation to axis 142 of slide 143 and arranged so as to rotate about an axis 144 perpendicular to the plane of member or frame 145. Where semi-cylindrical slides and slideways are utilized, the cross-section of the rolling surfaces is a circle having the same radius as the slides with center at the point of intersection 146 of the latter.

While considerable emphasis has been placed upon coupling means in which coupling portions all of one particular kind, such as slideways, are on certain of the members to be coupled, and other coupling portions all of another particular kind, such as slides, are on the others of the members to be coupled, thus to form interengaging sets of coupling portions, it will be distinctly understood that certain advantages are had still in accordance with the present invention through providing different kinds of coupling portions on each of the members for coupling and uncoupling the members of the circuitious series as desired.

As many possible embodiments of the invention may be made and as many possible changes may be made in the embodiments hereinbefore set forth, it will be appreciated that all matter described and illustrated herein is to be interpreted as illustrative and not as a limitation.

I claim:

1. In combination with a plurality of similar members suited for forming a circuitous series and having alignments thereof changed within the series, first slides and first slideways respectively on first sides of said members and extending longitudinally parallel to first axes of said members and having lateral portions for said first slides and first slideways to longitudinally engage in sets and couple said members laterally of said first axes of said members, and second slides and slideways respectively on second sides of said members and extending longitudinally parallel to second axes of said members at substantially right angles to said first axes and having lateral portions for said second slides and slideways to longitudinally engage in sets and couple said members laterally of said second axes of said members, said slides and slideways on said members forming open cornered generally rectangular configurations, whereby a relative longitudinal movement and lateral uncoupling of said slide and slideway of any one of said sets corresponding to either of said axes may be succeeded by laterally coupled engagement of the next one of said slides and slideways corresponding to the other of said axes upon the latter said slide and slideway being relatively longitudinally moved one into the other.

2. The combination according to claim 1, wherein at least some of said first slides and corresponding first slideways respectively are of male and female semi-cylindrical form and engage with their axes substantially coincident for hinging, said semi-cylindrical slideways having longitudinally extending slots through said lateral portions thereof and said slots interconnecting corresponding open corners of the corresponding said generally rectangular open-cornered configuration, said semi-cylindrical slides corresponding to said slots each having an extension for extending laterally through said slot, and said extension of said semi-cylindrical slide having a substantially smaller maximum dimension in thickness than the minimum width dimension of said slot to provide hinging freedom of said semi-cylindrical slide and slideway.

3. The combination according to claim 2, wherein at least some of said second slides and corresponding second slideways respectively are also of male and female semi-cylindrical form and engage with their axes substantially coincident for hinging, said semi-cylindrical second slideways having longitudinally extending second slots through said lateral portions thereof and said second slots interconnecting corresponding open corners of the corresponding said generally rectangular open cornered configuration, said semi-cylindrical second slides corresponding to said second slots each having an extension for extending laterally through said second slot, and said extension of said second semi-cylindrical slide having a substantially smaller maximum dimension in thickness than the minimum width dimension of said second slot to provide hinging freedom in said second slot.

4. In combination with a plurality of members adapted to be moved relatively to each other in directions of each of two different rectangular coordinate axes, a plurality of coupling components on said members for moving with said members, said coupling components forming sets of first coupling portions and sets of second coupling portions for coupling said member in different alignments in a circuitous series of said members, said first coupling portions of the set being relatively movable along one of said axes for engaging and disengaging each other and extending for interlocking laterally of said one of said axes and coupling their corresponding members in one of said alignments, and said second coupling portions in each of said second sets being relatively movable along the other of said axes for engaging and disengaging each other after said first coupling portions of said pair of members are disengaged and extending for interlocking laterally of said other of said axes and coupling their corresponding members in the other of said alignments, at least some of said sets of said coupling portions adapted to interengage laterally of said other of said axes including a longitudinally relatively movable slide and slideway respectively as coupling portions each on the corresponding said member, one of said coupling portions of the latter said set including longitudinally spaced fixed coupling sections and a pivotally mounted coupling section intermediate said fixed coupling sections for pivoting on an axis having direction of the third rectangular coordinate axis of said member to and from alignment with said fixed coupling sections, and the other said coupling portion of the latter said set cooperating with said pivotally mounted section and fixed coupling sections and having a length which is at most equal to the length of said pivotally mounted section for engaging and disengaging said pivotally mounted section when said sections are aligned, and for moving with the latter said section.

5. The combination of claim 4, wherein a plurality of latches each corresponding to one of said pivotally mounted sections is provided, and each said latch has biasing means for maintaining said pivotally mounted coupling section normally in latched engagement with the corresponding said member and in alignment with the related fixed coupling sections for said pivotally mounted coupling section to receive said other coupling portion of the corresponding said set, and said latch having an extension for contacting said other coupling portion for said latch to release said pivotally mounted coupling section against said biasing means in respnse to said other coupling portion being moved into coupled engagement with said pivotally mounted coupling section.

6. The combination according to claim 1, wherein said slideways are on alternate ones of said members corresponding to the series and respectively form on each said alternate member a generally rectangular female slideway configuration having four open corners outside corresponding ends of said slideways, and said slideways having longitudially extending slots through said lateral portions thereof with said slots intercommunicating with said four open corners, and said slides are on the others of said members corresponding to the series and respectively form a generally rectangular male slideway configuration on each of the latter said members wherein said slides have ends in each of four locations and have extensions laterally through the related said slots while said lateral portions of said slides and slideways are engaged, and said combination further including projections on said members having said slides, each said projection being in common alignment with the adjacent said slides in said male slide configuration and spaced from said slides in said four locations, and said projections having a size within the size limits of solids of intersection of said slides for changing engagement with corresponding said ends of said slideways via said open corners.

7. The combination according to claim 6, wherein at least some of said slides and slideways respectively are of male and female semi-cylindrical form and engage with their axes substantially coincident for hinging, and said extension of said semi-cylindrical slide having a substantially smaller maximum dimension in thickness than the minimum width dimension of said slot to provide hinging freedom of said semi-cylindrical slide and slideway.

8. The combination according to claim 6, wherein at least some of said projections include rotatably mounted devices for changing engagement with corresponding said ends of said slideways via said open corners and for rotating against the insides of the latter said slideways.

9. The combination according to claim 1, wherein at least some of said sets of slides and slideways include a pivot for pivoting on an axis generally perpendicular to the plane of the related said member.

10. The combination according to claim 6, wherein at least some of said sets of slides and slideways include longitudinally spaced fixed coupling sections and a pivotally mounted coupling section intermediate said fixed coupling sections for pivoting on an axis generally perpendicular to the plane of the related said member, and said coupling component of said set cooperating with said pivotally mounted coupling section having a length which is at most equal to the length of said pivotally mounted coupling section for engaging said pivotally mounted coupling section and moving with the latter said section.

11. The combination according to claim 10, wherein a latch is provided corresponding to said pivotally mounted coupling section for maintaining said pivotally coupling section latched in alignment with the related said fixed coupling sections for said pivotally mounted coupling section to receive said other coupling portion of the set, said latch including latching and biasing means for maintaining said pivotally mounted coupling section normally latched in said alignment with the corresponding said fixed coupling sections of the set, and means for contacting said other coupling component of said set for unlatching in response to coupling of said pivotally mounted coupling section and said other coupling component.

12. Transport apparatus comprising movable means including a circuitous series of similar movable adjacent members each having guide follower means adapting said members to be guided circuitously in alternating first axial and transverse second axial movements and in a transitional shifting movement between each of said first and second movements, and said movable means further including coupling means comprising coupling components on said members for moving with said members and maintaining said members coupled in said first and second movements of said members, said coupling components having first coupling portions adapted to engage each other for coupling said members into coupled relations corresponding to said first movements of said members for the corresponding said first movement to ensue and to disengage each other following the end of said corresponding first movement of said members for said members to be coupled for a next said second movement of said members, and said coupling components having second coupling portions adapted to engage each other for coupling said members into coupled relations corresponding to said second movements of said members for the corresponding said second movement to ensue and to disengage each other after said corresponding second movement for said members to be coupled for a next said first movement of said members, and said coupling components being responsive to said transitional movements of said members for uncoupling and recoupling according to which of said first and second movements of said members is to be supplanted by the other, and said apparatus further including drive and guide means, said drive and guide means comprising guide means including a plurality of first guide sections for engaging said guide follower means and guiding said members for said members to be moved in accordance with said first movements while coupled, a plurality of second guide sections for engaging said guide follower means and guiding said members for said members to be moved in accordance with said second movements while coupled, and a plurality of intermediate guide sections, each said intermediate guide section extending from a corresponding end of one of said first guide sections to a corresponding end of one of said second guide sections, and each said intermediate guide section for engaging said guide follower means and guiding said members in a constantly same oriented axially parallel transitional shifting relation to each other, wherein first opposed edges of those of said members adjacent to the corresponding end of said first guide section are in over-extending relation to one another and second opposed edges of those of said members adjacent to the corresponding end of said second guide section are in over-extending relation to each other and said coupling components shift from whichever of said first and second movements is undergoing transition to the other, to a said coupling relation corresponding to whichever of said first and second movements is to ensue, and said drive and guide means further including drive means drivingly engaging said members for moving said members along said circuitous guide means.

13. Transport apparatus according to claim 12, wherein said first coupling portions of said coupling components are relatively movable along first axes for engaging in interfitting first sets and being disengaged and extend for interlocking laterally of the corresponding said first axis for coupling said members in said coupled relations corresponding to said first movements of said members, and wherein said second coupling portions of said coupling components are relatively movable along second axes for engaging in interfitting second sets and being disengaged and extend for interlocking laterally of the corresponding said second axis for coupling said members in said coupled relations corresponding to said second movements of said members.

14. Transport apparatus according to claim 13, wherein at least some of said sets of coupling portions are characterized by having one of said coupling portions of a corresponding said set hingedly interfit with the other said coupling portion of the corresponding said set for hinging about the axis of the corresponding said set, and wherein slots extend axially of one of said coupling components of the corresponding said sets while the other of said coupling portions of the corresponding said set extends through said slot and has freedom in said slot in maintaining said members corresponding to said set hingedly coupled.

15. Transport apparatus according to claim 13, wherein one of said coupling portions in at least some of said sets of coupling portions includes a connector pivotally mounted on the corresponding said member for pivoting on an axis generally perpendicular to the plane of said corresponding member, and the other said coupling portion of said set is adapted to engage said connector in one of said coupled relations through said relative movement of said coupling portions of said set for pivotally connecting said members corresponding to said set.

16. Transport apparatus comprising movable means including a circuitous series of similar movable adjacent members each having guide follower means adapting said members to be guided circuitously in alternating first axial and transverse second axial movements and in a transitional shifting movement between each of said first and second movements, and said movable means further including coupling means comprising pairs of longitudinally relatively movable first slides and first slideways respectively on said members for moving with said members and having first lateral portions adapted to engage each other for coupling said members into coupled relations corresponding to said first movements of said members for the corresponding said first movement to ensue and to disengage each other following the end of said corresponding first movement for said members to be coupled for a next said second movement of said members, and pairs of relatively longitudinally moveable second slides and second slideways respectively on said members for moving with said members and having second lateral portions adapted to engage each other for coupling said members with coupled relations corresponding to said second movements for the corresponding second movement to ensue and to disengage each other after said corresponding second movement for said members to be coupled for a next said first movement of said members, and said coupling components being movable in response to said transitional movements of said members for uncoupling and recoupling according to which of said first and second coupled movements of said members is to be supplanted by the other, and said apparatus further including drive and guide means, said drive and guide means comprising guide means including a plurality of first guide sections for engaging said guide follower means and guiding said members for said members to be moved in accordance with said first movements while coupled, a plurality of second guide sections for engaging said guide follower means and guiding said members for said members to be moved in accordance with said second movements while coupled, and a plurality of intermediate guide sections, each said intermediate guide section extending from a corresponding end of one of said first guide sections to a corresponding end of one of said second guide sections, and each said intermediate guide section for engaging said guide follower means and guiding said members in a constantly same oriented axially parallel transitional shifting relation to each other wherein first opposed edges of those of said members adjacent to the corresponding end of said first guide section are in over-extending relation to one another and second opposed edges of those platform members adjacent to the corresponding end of said second guide section are in over-extending relation to each other and said slides and slideways shift from a said coupling relation corresponding to whichever of said first and second movements is undergoing transition to the other to a said coupling relation corresponding to whichever of said first and second movements is to ensue, and said drive and guide means further including drive means drivingly engaging said members for moving said members along said circuitous guide means.

17. Transport apparatus according to claim 16, wherein said slideways are on alternate ones of said members and said slides are on the other alternate ones of said members, and said first and second slideways respectively being substantially parallel to each other and together forming a generally rectangular female slideway configuration having four open corners outside corresponding ends of said slideways and said slideways having longitudinally extending slots through said lateral portions thereof, communicating with said four open corners, and said first and second slides respectively being substantially parallel to each other and forming a generally rectangular male slideway configuration wherein said first and second slides have ends in each of four locations and extensions to project laterally through the related said slot while said lateral portions of said slideway and slide are engaged, and said coupling means further includes projections on said alternate members having said slides, said projections being in common alignment with a corresponding one of each of said first and second slides and spaced from said ends of said slides in said four locations, and said projections being of a size falling within the size limits of solids of intersection of said slides for changing engagement with corresponding said ends of said slideways via said open corners.

18. Varying speed transport apparatus comprising movable means including a circuitous series of similar longitudinally and transversely movable adjacent members each greater in length than in width and each of said members having guide follower means adapting said members to be guided circuitously in alternating lengthwise and widthwise movements and in a transitional shifting movement between each of said lengthwise and widthwise movements, and said movable means further including coupling means comprising coupling components on said members for moving with said members and maintaining said members coupled in said lengthwise and widthwise movements of said members, said coupling components having first coupling portions adapted to engage each other for coupling said members into coupled relations corresponding to said lengthwise movements of said members for the corresponding lengthwise movement to ensue and to disengage each other following the end of said corresponding lengthwise movement of said members for said members to be coupled for a next said widthwise movement of said members, and said coupling components having second coupling portions adapted to engage each other for coupling said members into coupled relations corresponding to said widthwise movements of said members for the corresponding said widthwise movement to ensue and to disengage each other after said corresponding widthwise movement for said members to be coupled for a next said lengthwise movement of said members, and said coupling components being responsive to said transitional movements of said members for uncoupling and recoupling according to which of said lengthwise and widthwise movements of said members is to be supplanted by the other, and said apparatus further including circuitous guide means comprising a plurality of first guide sections corresponding to low speed zones of the apparatus for engaging said guide follower means and guiding said members for said members to move widthwise through said low speed zones while coupled, a plurality of second guide sections corresponding to high speed zones of the apparatus for engaging said guide follower means and guiding said members for said members to move lengthwise through said high speed zones while coupled, and a plurality of intermediate guide sections, each said intermediate guide section extending from a corresponding end of one of said first guide sections to a corresponding end of one of said second guide sections, and each said intermediate guide section corresponding to a varying speed zone of the apparatus for engaging said guide follower means and guiding said members in a constantly same oriented longitudinally axially parallel transitional shifting relation to each other wherein sides of those of said members adjacent to the low speed end of the corresponding varying speed zone are in over-extending relation to one another and ends of those members adjacent to the high speed end of the corresponding varying speed zone are in over-extending relation to each other and said coupling components shift from a said coupling relation corresponding to whichever of said widthwise and lengthwise movements is undergoing transition to the other to a said coupling relation corresponding to whichever of said widthwise and lengthwise movements is to ensue, and drive means drivingly engaging said members for moving said members through said low speed zones at low speed, through said high speed zones at relatively high speed and through said varying speed zones at a speed which progressively increases from the low speed end of said varying speed zone to the high speed end of said varying speed zone.

19. Varying speed transport apparatus according to claim 18, wherein said coupling means includes for each of said members opposed side extensions of said member and opposed end extensions of said member, said opposed end extensions for each said member and the leading adjacent said member paired therewith in said circuitous series of members including end coupling components having interlocking portions for maintaining said pairs of members connected together in said high speed zones, and said opposed side extensions of each said member and the leading adjacent member paired therewith in said circuitous series of members including end coupling components having interlocking portions for maintaining said pair of members connected toegther in said low speed zones, and said end coupling components and slide coupling components being relatively movable for uncoupling said pair of members from the corresponding one of said coupled relations of said members and coupling said pair of members into the other of said coupled relations in response to said pair of members being shifted rectilinearly from and to each other transitionally.

20. Varying speed transport apparatus according to claim 18, wherein said coupling means includes for each of said members substantially parallel opposed side extensions of said member and substantially parallel opposed end extensions of said member, said opposed end extensions for each said member and the leading adjacent said member paired therewith in said circuitous series of members forming end slides and respectively cooperating end slideways having laterally interlocking portions for maintaining said pair of members connected together in said high speed zones, and said opposed side extensions for each said member and the leading adjacent said member paired therewith in said circuitous series of members forming side slides and respectively cooperating side slideways having laterally interlocking portions for maintaining said pair of members connected together in said low speed zones, and said cooperating slides and slideways being relatively slidable longitudinally for uncoupling said pair of members from said corresponding one of said coupled relations of said members and coupling said pair of members into the other of said coupled relations of said members in response to said pair of members being shifted rectilinearly from and to each other transitionally.

No references cited.

ARTHUR L. LA POINT, *Primary Examiner.*

MILTON BUCHLER, *Examiner.*

Dedication

3,238,893.—*Paul Zuppiger*, Carouge, Geneva, Switzerland. VARYING SPEED TRANSPORT APPARATUS, TRANSPORT MEMBERS AND COUPLINGS. Patent dated Mar. 8, 1966. Dedication filed Aug. 2, 1974, by the assignee, *The Battelle Development Corporation.*

Hereby dedicates to the People of the United States the entire remaining term of said patent.

[*Official Gazette November 19, 1974.*]